（12）United States Patent
Jasmin et al.

(10) Patent No.: US 9,517,728 B2
(45) Date of Patent: Dec. 13, 2016

(54) ADJUSTABLE BAG HOOP

(71) Applicant: Club Car, LLC, Evans, GA (US)

(72) Inventors: John Wiley Jasmin, Aiken, SC (US); Bryon Jon Danielson, Martinez, GA (US); Roger Kevin Eubanks, Grovetown, GA (US); William D. Reeves, Jr., Grovetown, GA (US)

(73) Assignee: CLUB CAR, LLC, Evans, GA (US)

( * ) Notice: Subject to any disclaimer, the term of this patent is extended or adjusted under 35 U.S.C. 154(b) by 38 days.

(21) Appl. No.: 14/332,236

(22) Filed: Jul. 15, 2014

(65) Prior Publication Data
US 2015/0014378 A1 Jan. 15, 2015

Related U.S. Application Data

(60) Provisional application No. 61/846,524, filed on Jul. 15, 2013.

(51) Int. Cl.
B60R 9/06 (2006.01)
B60R 9/08 (2006.01)
B62B 1/26 (2006.01)

(52) U.S. Cl.
CPC ............... B60R 9/08 (2013.01); B62B 1/266 (2013.01); *Y10T 29/49947* (2015.01)

(58) Field of Classification Search
CPC .............. B60R 9/08; B60R 9/06; B62B 1/266; B62B 1/264; Y10T 29/49947
See application file for complete search history.

(56) References Cited

U.S. PATENT DOCUMENTS

| 1,517,901 | A | * | 12/1924 | Gill | ............................ B62B 1/10 414/457 |
| 4,497,092 | A | | 2/1985 | Hoshino | |
| 4,596,484 | A | | 6/1986 | Nakatani | |
| 4,761,092 | A | | 8/1988 | Nakatani | |
| 4,887,835 | A | | 12/1989 | Dallaire et al. | |
| 5,775,352 | A | | 7/1998 | Obitts | |
| 6,298,555 | B1 | * | 10/2001 | Vincenti | ............... E04F 19/061 138/DIG. 4 |
| 6,695,184 | B2 | * | 2/2004 | Higginbotham, III | .... B60R 9/06 224/501 |
| 6,705,901 | B1 | * | 3/2004 | Lin | ..................... H01R 13/2421 439/490 |
| 7,416,195 | B2 | * | 8/2008 | Zwack | ..................... B62B 1/264 280/43.1 |
| 7,688,187 | B2 | * | 3/2010 | Caird | ........................ B60Q 9/00 340/425.5 |
| 8,226,057 | B2 | * | 7/2012 | Ao | ......................... H01Q 1/1228 248/218.4 |
| 8,662,363 | B2 | * | 3/2014 | Williams | ................ A63B 47/04 14/21 |
| 2011/0042539 | A1 | * | 2/2011 | Melic | ................... E04G 21/3233 248/354.7 |
| 2015/0231780 | A1 | * | 8/2015 | Hirokawa | ............ B25H 1/0014 224/518 |

* cited by examiner

*Primary Examiner* — Gary Elkins
(74) *Attorney, Agent, or Firm* — Taft Stettinius & Hollister LLP

(57) ABSTRACT

A golf cart is provided with an adjustable golf bag hoop. The hoop is provided with a rod and a cam-locked collar. The collar is moveable along the length of the rod to adjust to varying heights of golf bags.

21 Claims, 5 Drawing Sheets

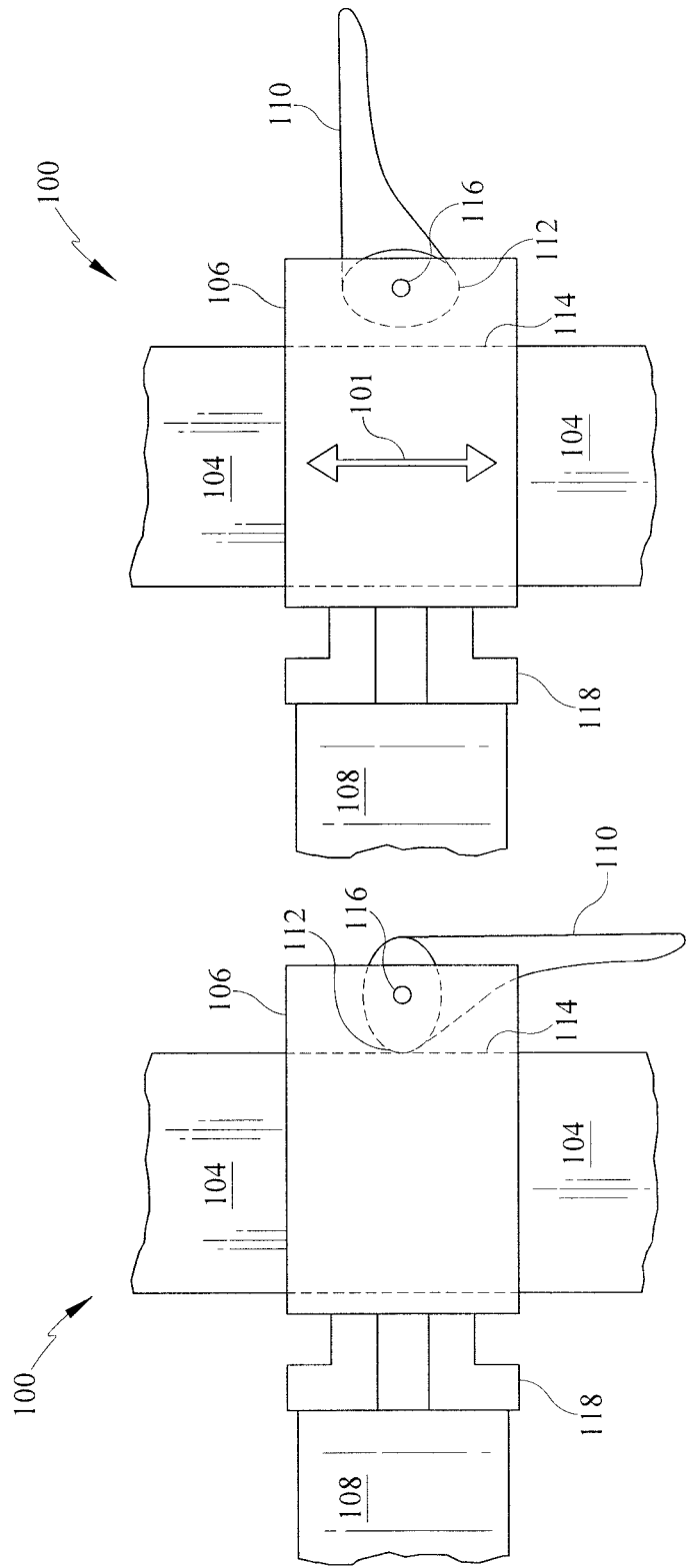

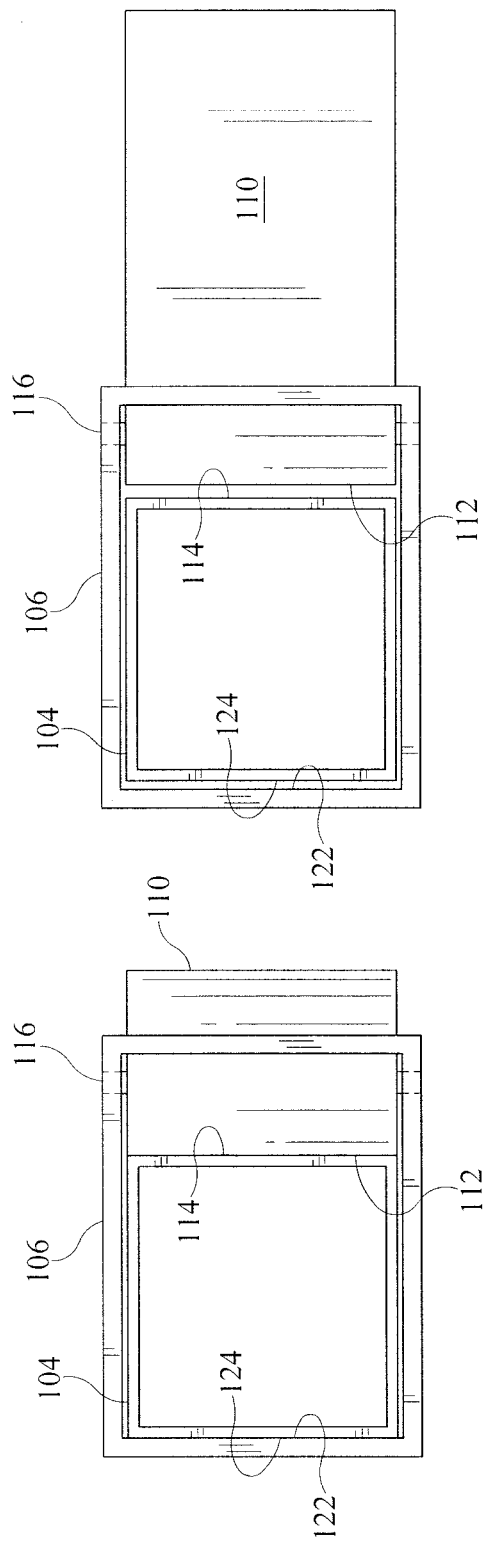

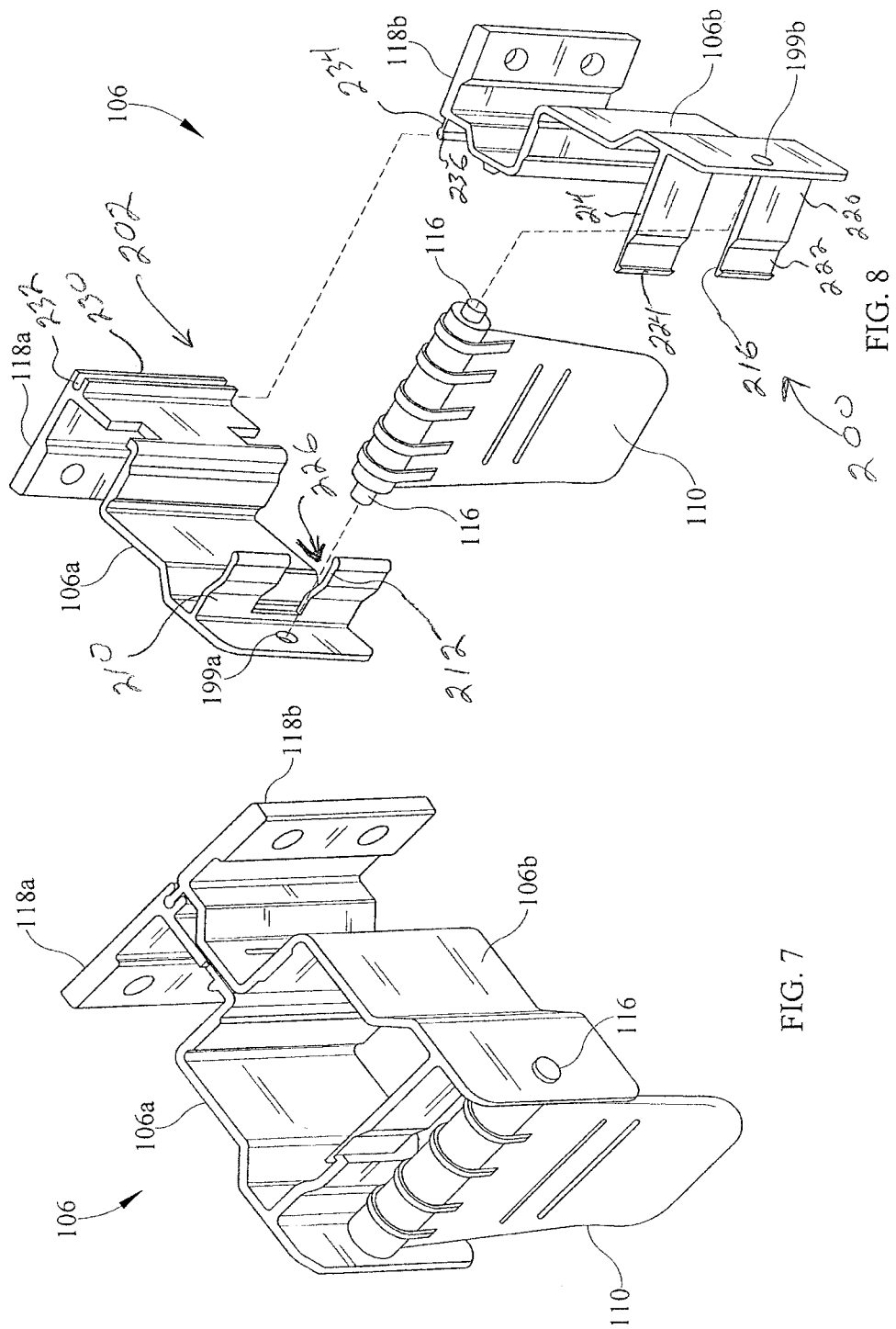

ADJUSTABLE BAG HOOP

CROSS REFERENCE TO RELATED APPLICATIONS

The present application claims the benefit of U.S. Provisional Patent Application 61/846,524, filed Jul. 15, 2013, and is incorporated herein by reference.

TECHNICAL FIELD

The present disclosure generally relates to golf carts, and more particularly, but not exclusively, to golf carts that support golf bags of varying heights.

BACKGROUND

Alleviating difficulties found in supporting golf bags of varying heights remains an area of interest. Present approaches to this suffer from a variety of limitations and disadvantages relative to certain applications. For instance, some applications in this field can only support a golf bag at a single height. Accordingly, there is a need for further contributions to this technology

SUMMARY

One embodiment of the present disclosure is a unique vertically adjustable bag hoop. Other embodiments include apparatuses, systems, devices, hardware, methods, and combinations for the same. Further embodiments, forms, features, aspects, benefits, and advantages of the present application shall become apparent from the description and figures provided herewith.

BRIEF DESCRIPTION OF THE FIGURES

FIG. 2 is a side view of an embodiment of the present disclosure in a locked state.

FIG. 3 is a side view of an embodiment of the present disclosure in an unlocked state.

FIG. 4 is a top view of an embodiment of the present disclosure in a locked state.

FIG. 5 is a top view of an embodiment of the present disclosure in an unlocked state.

FIG. 7 is a perspective view of another embodiment of a buckle assembly of the present disclosure.

FIG. 8 is an exploded assembly view of the embodiment shown in FIG. 7.

DETAILED DESCRIPTION OF THE ILLUSTRATIVE EMBODIMENTS

Figure 1:
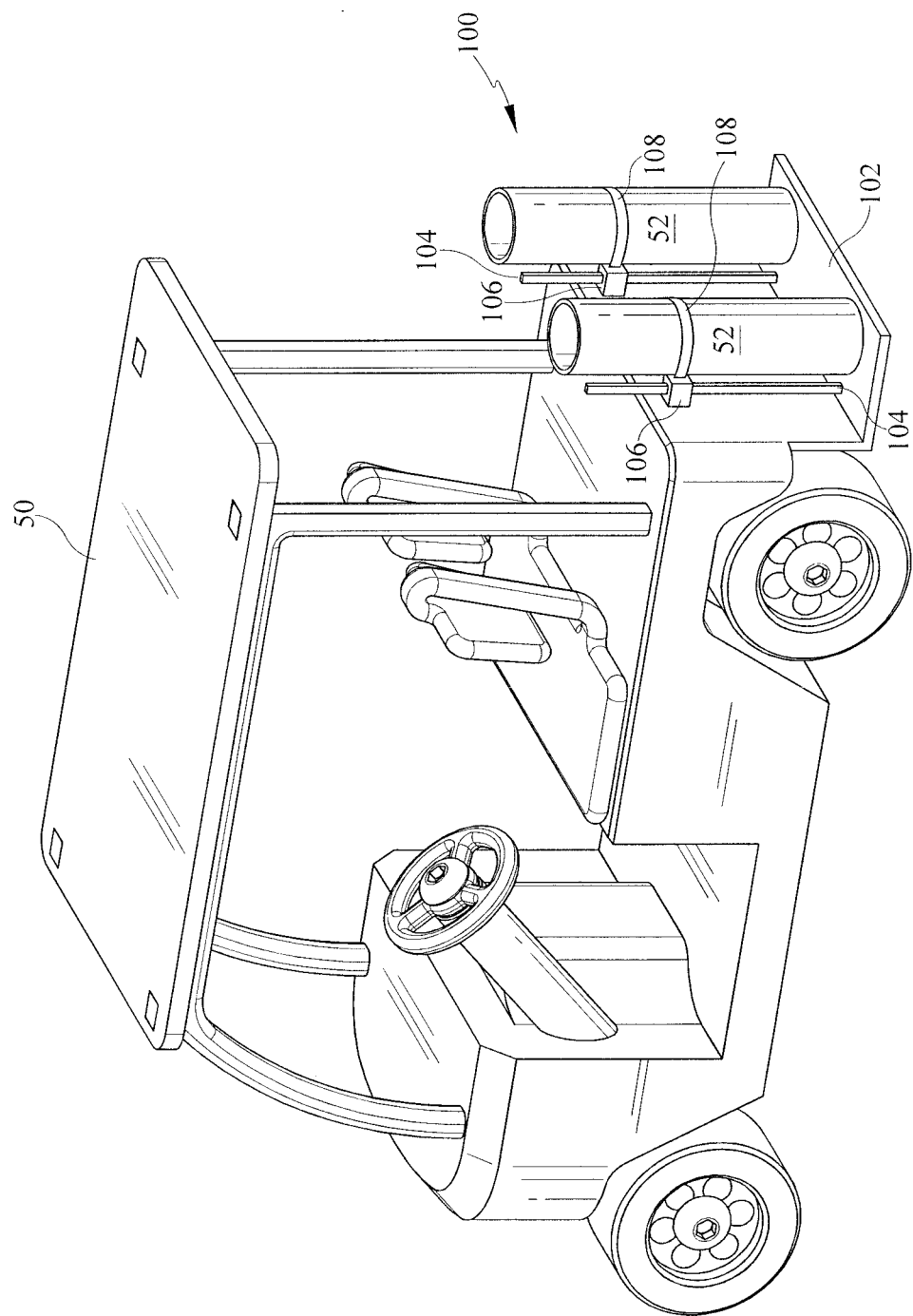
FIG. 1 is a schematic view of a golf cart with an embodiment of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring now to FIG. 1, an example golf cart 50 is provided with an example embodiment of an adjustable golf bag hoop 100 of the present disclosure. As used herein, golf cart may refer to any motorized or manually operated wheeled vehicle, and may or may not be capable of carrying one or more passengers. The golf cart 50 is provided with a support member or platform 102 for supporting a golf bag 52. In one form, the support member or platform is generally horizontal. The platform 102 may further include upstanding walls along one or more of the edges to prevent the lower end of the golf bag 52 from sliding off of the platform 102. As shown, the adjustable golf bag hoop 100 is vertically adjustable to accommodate golf bags 52 of varying heights. More specifically, in one form, the golf bag hoop 100 is moveable along the pole or rod 104. The adjustable golf bag hoop 100 is provided to prevent the golf bag 52 from tipping over when the golf cart 50 is in motion or stationary.

Referring now to FIGS. 1-3, an example of an adjustable golf bag hoop 100 of the present disclosure is provided with a generally vertical support member, such as a rod or pole 104 and a slidingly translatable collar 106 disposed about the rod 104. The vertical rod 104 may be generally orthogonal to the horizontal platform 102, and may extend from or be mounted at some fixed position above the horizontal platform 102. In order to keep the collar 106 from rotating about the rod 104, the rod may have a rectangular exterior cross-section, such as a square, or any other polygonal cross-section, with the collar 106 having a similar internal cross-section. In another embodiment, the rod 104 may have a round exterior cross-section with a key way, and the collar 106 having a similar interior cross-section. The present application contemplates other geometric relations that will prevent the collar 106 from rotating about the rod 104. Furthermore in some applications, it may be desirable for the collar 106 to rotate about the rod 104. In one embodiment, the appropriate cross-sections are geometrically round and without a key way.

The collar 106 is provided with a belt, loop, or hoop 108 for wrapping around the golf bag 52 and preventing it from tipping as discussed above. The wrapping around the golf bag 52 may be around the entire circumference or a portion thereof. The belt 108 may be made of any appropriate material such as, but not limited to, a flexible fabric, plastic, or a metal band. The belt 108 may be secured about the bag by any known means, such as by any known buckle or cam lock to secure the belt in a fixed circumferential length about the golf bag 52. The belt 108 may be secured to the collar 106 by any appropriate means, such as with a bracket 118 and secured with threading or fasteners, depending on what is most appropriate for the chosen material and expected forces to be exerted upon the belt 108.

With reference to FIGS. 2-5, an example adjustable golf bag hoop 100 of the present disclosure is provided with detailed views of the collar 106 and its interaction with the rod 104. The collar 106 is provided with a cam lever 110, that is pivotable or rotatable about pivot 116. The belt 108 may be provided on a separate side of the collar 106 than the lever 110, however this is not necessary.

The lever 110 is further provided with a cam surface 112. As the lever 110 pivots about pivot 116, the cam surface 112 moves into contact with or away from a first surface 114 of the rod 104 depending upon the direction of rotation of the lever 110. When the lever 110 is pivoted in a clockwise direction (as shown in comparison of FIGS. 2 and 3), the cam surface 112 comes into contact with an exterior first surface 114 of the rod 104. As can be seen in FIGS. 4 and 5, this urges the collar 106 to one side of the rod 104 while also bringing an interior second surface 122 on the collar 106 into contact with an exterior third surface 124 on the rod 104. This effectively creates a friction fit between the rod 104 and collar 106 to fix each relative to one another. When the lever 110 is pivoted in a counter-clockwise direction (as shown in comparison of FIGS. 2 and 3), the cam surface 112 moves away from the first surface 114 providing clearance between the two surfaces 112, 114, and between the second and third surfaces 122, 124, allowing the collar 106 to move or translate along a longitudinal axis 101 of the rod 104. The rod 104 may be provided with stops (not shown) to limit the range of motion of the collar 106 and to keep it from falling all the way to the bottom of the rod 104 when it is loose.

Figure 6:
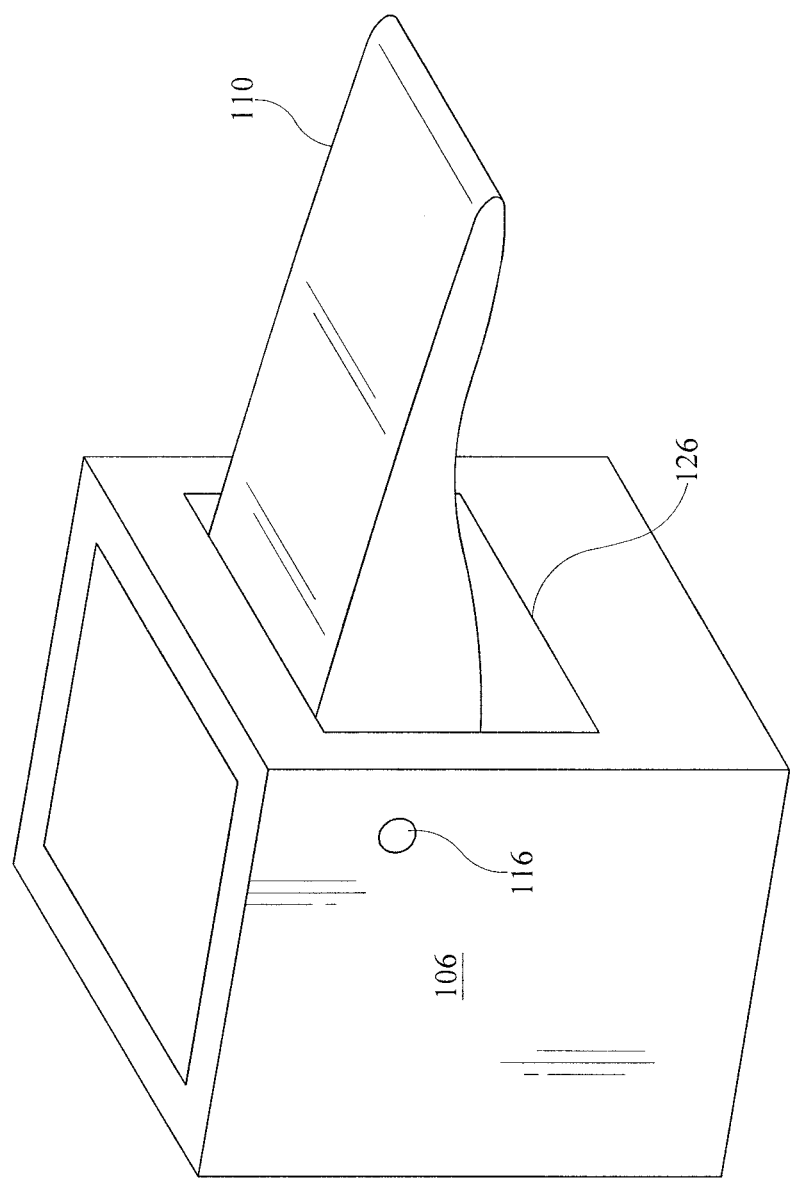
FIG. 6 is a schematic view of an embodiment of a buckle assembly of the present disclosure.

With reference to FIG. 6, an example collar 106 is provided with an opening 126 for which the lever 110 may penetrate. The opening 126 is provided to allow a handle portion of the lever 110 to be manipulated by a user while allowing the cam surface (not shown) access to contact an exterior surface of the rod (not shown).

Referring now to FIGS. 7 and 8, one embodiment of a collar 106 is provided as two halves 106a, 106b. The collar 106 is provided with a bracket 118a, 118b for attaching a belt (not shown). A lever 110 is provided with integral pivots 116 that are pivotably connected in openings 199a and 199b formed in the brackets 118a and 118b. Alternatively, the pivot may be a rod or shaft that affixes to the collar 106 and is rotationally mounted within the lever 110. Furthermore, the pivot may be a rod or shaft that affixes to the lever 110 and is rotationally mounted to the collar 106.

As shown, the two collar halves 106a, 106b can be joined together by a snap fit connection after assembly about a rod 104 to permit attachment of the collar 106 to a rod (not shown) without the use of any tools. Alternatively, the two collar pieces may fit together with the use of any known means, such as by threaded fasteners or the like. The snap fit connection can include a forward connector 200 and an aft connector 202. The terms forward and aft should not be construed as absolute locations relative to the golf cart, but are merely recited to differentiate locations relative to the cam lever 110. It should be understood that some embodiments may have more or less connector locations to attach the two halves 106a, 106b of the collar 106 together. In yet other embodiments the collar 106 may be formed as a permanently fixed assembly or as an integral single piece component.

The forward connector 200 can include first and second flexible legs 210, 212 extending from one halve 106a and third and fourth flexible legs 214, 216 extending from the other halve 106b of the collar 106. Each of the flexible legs 210, 212, 214, and 216 can include a base portion 220 connected to the collar 106 that transitions to a narrowing track region 222 and terminates with an edge clip 224 extending at least partially transverse to the track region 222. The first and third flexible legs 210, 214 overlap one another and cooperate to form a snap fit connection when the two halves 106a and 106b are assembled together. Similarly, the second and fourth flexible legs 212 and 216 can form another snap fit connection at the forward connector location 200. The edge clips 224 of each respective connecting pair of flexible legs 210, 214 and 212, 216 protrude toward one another such that unless the legs are flexed in one direction or the other, the edge clips will lockingly engage with one another and prevent separation of the two halves of the collar 106. The edge clips 218 can move radially inward along the corresponding track region 222 as required to assemble the collar together, but will prevent radial outward movement past the opposing edge clip 224 unless at least one of the legs are deflected. The cooperating pairs of flexible legs 210, 214 and 212, 216 can be spaced apart to form an opening 226 for the cam surface 112 of the cam lever 110 to move therethrough when selectively engaging the first surface 114 of the rod 104.

The aft connector 202 can include an elongate groove 230 with a female receiving portion 232 formed along a length of one of the collar halves 106a. An elongate tongue 234 with an outwardly protruding connecting member 236 can extend along a length of the other of the collar halves 106b. The female receiving portion 232 and the protruding connecting member 236 can be complimentary in shape and are sized appropriately to form a releasable snap fit connection when engaged with one another.

In operation the two halves 106a, 106b can be assembled about a rod 104 and the aft connector can be locked by snap fitting the tongue 234 on one side into the groove 230 on the other side. The forward portion can be releasably locked together by sliding the flexible legs couplings past one another which causes the legs to deflect until the edge clips 218 move past one another and lock into engagement along the track portion 222. After the collar 106 is operably coupled to the rod 104, the cam lever 110 can be manipulated to fix the collar in place in a locked position or permit sliding movement of the collar in an unlocked position.

One aspect of the present disclosure contemplates a golf cart including a support member with a substantially linear longitudinal axis and a first surface; a collar circumferentially disposed about the first support member, and slidingly translatable along at least a portion of the longitudinal axis; a lever pivotally mounted to the collar and with a cam surface positioned to engage the first surface; and a belt mounted to the collar.

A refinement of the present disclosure provides that the collar is rotationally fixed to the first support member.

Another refinement provides that the lever is positioned on a first side of the collar and the belt is mounted to a second side of the collar.

Yet another refinement provides the collar including an opening with the cam surface at least partially penetrating through the opening.

Another refinement provides a horizontal support member with the collar being positioned at a height above the horizontal support.

Another refinement provides the first support member is orthogonal to the horizontal support member.

Yet another refinement provides that the collar is a two piece assembly, and the collar assembles via a snap fit.

Another aspect of the present disclosure contemplates a motorized wheeled vehicle with a generally horizontal golf bag support platform; a rod disposed generally normal to the support platform and having a substantially linear longitudinal axis and an exterior first surface and an exterior second surface; a collar circumferentially disposed about the rod, and slidingly translatable along the longitudinal axis, the collar includes an internal surface that is engageable with the second surface; a lever pivotally mounted to the collar and including a cam surface, with the cam surface positionable to engage the first surface; and a belt mounted to the collar suitable for securing a golf bag.

A refinement of the present disclosure provides that the rod extends from the support platform.

Another refinement provides that the collar is moveable in a limited range along the rod.

Yet another refinement provides that the collar is rotationally fixed to the rod.

Another refinement of the present disclosure provides that the lever is positioned on a first side of the collar and the belt is mounted to a second side of the collar.

Yet another refinement provides the collar, including an opening wherein at least a portion of the cam surface penetrates through the opening.

Yet another refinement provides that the collar is a two piece assembly, and the collar assembles via a snap fit.

Yet another aspect of the present disclosure includes a method of securing a golf bag to a golf cart comprising: supporting a golf bag on a platform; slidably connecting a collar to a support member extending substantially transverse to said platform; translating said collar along said support member to a desired location; locking said collar at the desired location with a cam lever; and tightening a belt extending from the slidable collar about said golf bag.

Refining aspects include a method wherein the slidably connecting includes a snap fit connection; the snap fit connection includes a forward connector with at least one pair of opposing flexible legs; the snap fit connection includes an aft connector with a tongue and groove connection; and the desired location includes a height corresponding to a location on the golf bag.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A golf cart comprising:
   a support member having a substantially linear longitudinal axis with a first surface and a second substantially flat surface opposite of the first surface;
   a collar circumferentially disposed about said support member, and slidingly translatable along at least a portion of said longitudinal axis;
   a lever pivotally mounted to said collar having a cam surface, wherein said cam surface is positioned to selectively engage said first surface at any position along the portion of said longitudinal axis of the support member;
   wherein the collar is engaged with the second surface of the support member when the cam surface is engaged with the first surface such that the collar is friction locked in fixed position relative to the support member; and
   a belt mounted to said collar.

2. The golf cart of claim 1, wherein said collar is rotationally fixed to said support member.

3. The golf cart of claim 1, wherein said lever is positioned on a first side of said collar and said belt is mounted to a second side of said collar.

4. The golf cart of claim 1, wherein said collar includes an opening, and wherein said cam surface at least partially penetrates through said opening in a locked position.

5. The golf cart of claim 1, further comprising a horizontal support platform, and wherein said collar is positioned at a height above said support platform.

6. The golf cart of claim 5, wherein said support member is permanently affixed to said support platform.

7. The golf cart of claim 1, wherein said collar is a two piece assembly.

8. The golf cart of claim 7, wherein said collar assembles about said support member via a snap fit.

9. A motorized wheeled vehicle comprising:
   a golf bag support platform;
   a rod disposed generally normal to said support platform and having a substantially linear longitudinal axis and an exterior first surface and a substantially flat exterior second surface;
   a collar circumferentially disposed about said rod, and slidingly translatable along said longitudinal axis, said collar includes an interior surface that is selectively engageable with said second surface;
   a lever pivotally mounted to said collar and includes a cam surface, wherein said cam surface is positionable to selectively engage said first surface at any position along said longitudinal axis;
   wherein the interior surface of the collar engages with the second surface of the rod in response to engagement of the cam surface with the first surface of the rod; and
   a belt mounted to said collar suitable for securing a golf bag.

10. The motorized wheeled vehicle of claim 9, wherein said rod extends from said support platform and is permanently mounted to said motorized vehicle.

11. The motorized wheeled vehicle of claim 9, wherein said collar is moveable in a limited range along said rod.

12. The motorized wheeled vehicle of claim 9, wherein said collar is rotationally fixed to said rod.

13. The motorized wheeled vehicle of claim 9, wherein said lever is positioned on a first side of said collar and said belt is mounted to a second side of said collar.

14. The motorized wheeled vehicle of claim 9, wherein said collar includes an opening, wherein at least a portion of said cam surface penetrates through said opening.

15. The motorized wheeled vehicle of claim 9, wherein said collar is a two piece assembly.

16. The motorized wheeled vehicle of claim 15, wherein said collar assembles via a snap fit.

17. A method of securing a golf bag to a golf cart comprising:
   supporting a golf bag on a platform;
   slidably connecting a collar to a support member having a substantially flat exterior surface extending substantially transverse to said platform;
   translating said collar along said support member to a desired location at any position on the support member;

locking said collar with a friction engagement of the flat exterior surface at the desired location with a cam lever; and tightening a belt extending from the slidable collar about said golf bag.

18. The method of claim 17, wherein the slidably connecting includes a snap fit connection.

19. The method of claim 18, wherein the snap fit connection includes a forward connector with at least one pair of opposing flexible legs.

20. The method of claim 18, wherein the snap fit connection includes an aft connector with a tongue and groove connection.

21. The method of claim 17, wherein the desired location includes a height corresponding to a location on the golf bag.

* * * * *